United States Patent [19]

Horinouchi et al.

[11] Patent Number: 4,630,074

[45] Date of Patent: Dec. 16, 1986

[54] MULTIPLE-STYLUS ELECTRODE FOR DISCHARGE PRINTING

[75] Inventors: Tamotsu Horinouchi; Takayoshi Ishikawa; Tsugutoshi Tanaka; Masahiro Ono, all of Kanagawa, Japan

[73] Assignees: Nippon Aleph Co. Ltd., Yokohama, Japan; Gestetner International Limited, England

[21] Appl. No.: 711,165

[22] Filed: Mar. 13, 1985

[30] Foreign Application Priority Data

Mar. 14, 1984 [JP] Japan .................................. 59-48548

[51] Int. Cl.⁴ ...................... G01D 15/16; G01D 15/06; H05B 1/00

[52] U.S. Cl. ................................ 346/139 C; 346/155; 219/216

[58] Field of Search ........... 346/139 C, 76 PH, 153.1, 346/155, 162, 163, 164, 165; 219/216 PH

[56] References Cited

U.S. PATENT DOCUMENTS 4,013,158 3/1977 Strange .

4,189,736 2/1980 DeFilipps ....................... 346/139 C

FOREIGN PATENT DOCUMENTS 1596996 9/1981 United Kingdom .

OTHER PUBLICATIONS

Materials Handbook, Brady, 25 Aug. 66, p. 684.

"IBM Technical Disclosure Bulletin, vol. 15, No. 3" (Aug. 1972).

*Primary Examiner*—E. A. Goldberg

*Assistant Examiner*—Mark Reinhart

*Attorney, Agent, or Firm*—Fleit, Jacobson, Cohn & Price

[57] ABSTRACT

A multiple stylus electrode for discharge printing body for discharge printing comprises a body mainly of a resin having a thermal deformation temperature of at least 200° C., having a plurality of electrode elements of an elongate core coated with borosiloxane resin in a parallel array extending from said electrode body.

4 Claims, 3 Drawing Figures

MULTIPLE-STYLUS ELECTRODE FOR DISCHARGE PRINTING

This invention relates to an electrode body to be used in imaging a stencil for use in a stencil duplicator.

In the past, a discharge electrode used in an automatic processing apparatus for a stencil has been provided with a number of electrode elements corresponding to the number of light-receiving elements scanning the image of an original. Therefore, stencil imaging time becomes long because of the required discharge time.

Although it has been proposed to provide several discharge electrodes corresponding with several optical channels, the electrodes must be arranged in a parallel array along the same line at a fixed interval. However, breaking down of the insulating material used in the conventional discharge electrode will occur with the heating due to the discharge of the adjacent electrodes, so it has been considered unfavourable to use the insulating material in the electrode body where high voltages are applied.

According to the present invention we provide an electrode for discharge printing in accordance with an applied electrical signal comprising a multiple-stylus electrode body having several electrode elements each composed of an elongate core of a high melting point material coated with a borosiloxane resin, wherein the electrode elements are arranged in a parallal array with one end of each said electrode element moulded within an insulating material consisting mainly of a resin having a thermal deforming temperature at least 200° C. With such an electrode, the insulation durability due to the borosiloxane resin or the insulating material may be sufficiently maintained, so that the insulation breakdown does not occur even if the spacing between the electrode elements is small. Simultaneous discharge with a multiple-stylus electrode permits a stencil to be imaged in a considerably shorter time as compared with the prior art.

In order that the present invention may more readily be understood the following description is given, merely by way of example, with reference to the accompanying drawings, in which.

Figure 1:
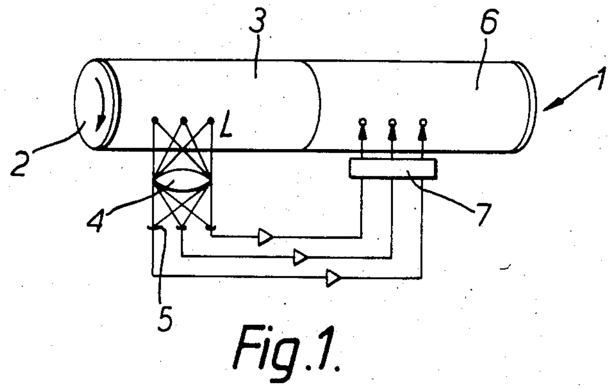
FIG. 1 is a schematic view of a stencil imaging apparatus using a multiple-stylus body according to this invention.

This imaging apparatus 1 supports an original 3 on the outer periphery of a cylindrical drum 2, and reflected light L from a light-emitting element is scanned by an optical system circuit comprising a condenser lens 4 and light-receiving elements 5, and the scanned signals are converted and amplified to image a stencil 6 by discharge of a multiple-stylus body 7.

When the imaging apparatus is provided with several optical channel circuits and an electrode body carrying a number of electrodes corresponding to the number of channel circuits, the discharge density can be increased in order to shorten the processing time.

However, the heating due to the discharge of the discharge electrodes will also be increased, so that the conventionally used insulating material might breakdown or melt and, as a result, the discharge electrode elements may not remain parallel at any line density.

Thus, the high melting point elongate core constituting each discharge electrode element is coated with borosiloxane resin, and these borosiloxane resin coated electrode elements are then disposed parallel at a constant pitch interval with one end of each electrode element 71,72 . . . 78 moulded within an insulating body 8 of a resin having a thermal deforming temperature of more than 200° C.

Consequently, the resistance to high voltage and the heat-resisting strength of the electrode elements are promoted among the adjacent electrode elements to prevent the insulation breaking down.

Therefore, when a signal from the electro-optical scanning system is converted and amplified for discharge, the stencil imaging process may be carried out reliably.

Figure 2:
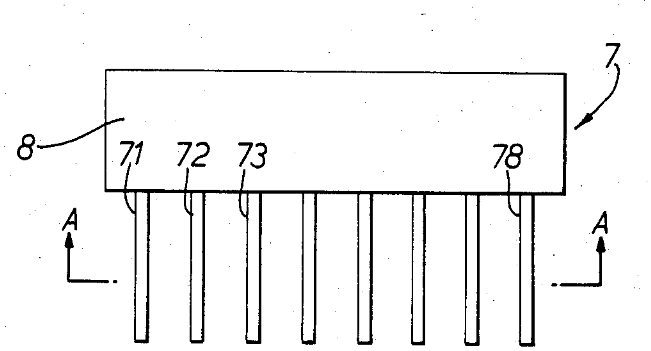
FIG. 2 is a schematic plan view of a multiple-stylus electrode body.

In FIG. 2 the multiple-stylus electrode body 7 comprises individual electrode elements of an elongate core of a high melting point material such as tungsten coated with the borosiloxane resin.

The discharge occurs at the unmoulded one ends of the electrode elements 71,72 while the parts which are moulded within the insulating material 8 are electrically connected through the insulating material 8 to supply terminals. Through these terminals, the desired voltage signals are applied to the electrode elements.

The borosiloxane resin for coating the electrode elements 71,72 is the preferred insulating material. A polyamide-coated electrode element broadly used in the past, may be continuously used at a temperature of 200° C., but may melt abruptly at a temperature of more than 400° C. However, the borosiloxane resin electrode element may be continuously used at temperatures of 450° C. and may even be used for a short time at a temperature of 600° C. and continue to maintain electric insulation.

Figure 3:
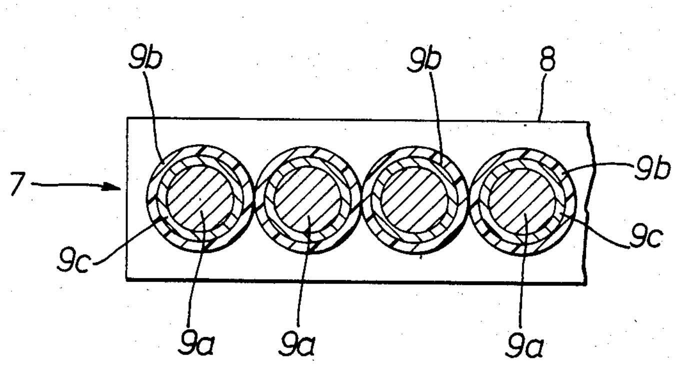
FIG. 3 is a section of the electrode body on the line A—A of FIG. 2.

FIG. 3 is partially sectional view taken along A—A line in FIG. 2 and shows the elongate high melting point tungsten core material *9a* and borosiloxane resin coating *9b*.

If desired the insulating material 8 may be the resin as is used for the coating *9b*, in the preferred case borosiloxane resin. Generally this insulating material will be resistant to the effects of temperatures up to 200° C.

The high melting point material of the electrode core *9a* may be provided with a surface-treated layer *9c* of nickel.

The borosiloxane resin coating *9b* may be applied by the same coating method as the normal enamel line coating.

When the coating layer of this borosiloxane resin *9b* has the thickness of 10–30 μm, the desired heat resistance and insulating durability may be sufficiently maintained. The diameter of the linear material for the core *9a* or the pitch between adjacent ones of the discharge electrode elements can be very small. For example a multiple-stylus electrode body with a high population density of electrodes may result if the linear material is formed with a diameter of 10 to 30 μm.

The method of moulding the insulating material may comprise winding the high melting point core material or wire *9a* coated with the borosiloxane resin *9b* on a drum so as to be parallel at a fixed pitch, and the wound linear material may be drawn off the drum and moulded with the insulating material 8, and thereafter cut to provide desired electrodes.

Then, the insulating material 8 is provided with terminals which are respectively connected with the high melting point wire core 9*b*.

As stated above, with the multiple-stylus electrode body of this invention, several electrode elements may be arranged parallel and aligned at the fixed pitch interval, and discharge may by carried out over a long time because the insulating material does not break down with heating due to the discharge.

Accordingly with the multiple-stylus electrode body of this invention the stencil imaging process may be carried out considerably faster than the prior art.

We claim:

1. An electrode for discharge printing in accordance with an applied electrical signal comprising (a) a multiple-stylus electrode body formed of an insulating material consisting mainly of a resin having a thermal deforming temperature at least 200° C.; and (b) several electrode elements each composed of an elongate core of a high melting point material coated with a borosiloxane resin, wherein the electrode elements are arranged in a parallel array and each has a first end moulded within said electrode body, and a second end projecting from said electrode body and laterally spaced from the second ends of the other electrode elements.

2. An electrode according to claim 1, characterised in that said insulating material of the electrode body is composed mainly of a borosiloxane resin.

3. An electrode according to claim 1, wherein the elongate core is of tungsten.

4. An electrode according to claim 3, wherein the tungsten core has a surface-treated layer of nickel under the borosiloxane resin coating.

* * * * *